United States Patent
Corigliano

(10) Patent No.: US 10,525,360 B1
(45) Date of Patent: *Jan. 7, 2020

(54) CONTROLLER DOCKING DEVICE FOR PORTABLE ELECTRONICS AND METHOD OF USE

(71) Applicant: Bryan Corigliano, Yulee, FL (US)

(72) Inventor: Bryan Corigliano, Yulee, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/919,145

(22) Filed: Mar. 12, 2018

Related U.S. Application Data

(63) Continuation-in-part of application No. 14/540,008, filed on Nov. 12, 2014, now Pat. No. 9,914,060, which is a continuation-in-part of application No. 13/549,769, filed on Jul. 16, 2012, now abandoned.

(60) Provisional application No. 61/508,291, filed on Jul. 15, 2011.

(51) Int. Cl.
*A63F 13/98* (2014.01)
*A63F 13/92* (2014.01)
*G06F 1/16* (2006.01)

(52) U.S. Cl.
CPC .............. *A63F 13/98* (2014.09); *A63F 13/92* (2014.09); *G06F 1/1632* (2013.01)

(58) Field of Classification Search
CPC ......... G06F 1/1632; A63F 13/92; A63F 13/98
See application file for complete search history.

(56) References Cited

U.S. PATENT DOCUMENTS 3,851,194 A  11/1974  Kawada
4,969,647 A  11/1990  Mical et al.
D378,104 S  2/1997  Harrell, Jr.
6,530,838 B2  3/2003  Ha et al.
D492,293 S  6/2004  Kim
D492,294 S  6/2004  Kim
6,786,826 B2  9/2004  Himoto et al.
(Continued)

OTHER PUBLICATIONS

"About Game Controllers"; Apple Inc.; accessed on the Internet on Dec. 3, 2018 at <URL https://developer.apple.com/library/archive/documentation/ServicesDiscovery/Conceptual/GameControllerPG/Introduction/Introduction.html> dated Sep. 13, 2016. (Year: 2016).*

(Continued)

*Primary Examiner* — Glenn A. Auve
(74) *Attorney, Agent, or Firm* — Allen D. Hertz, P.A.; Allen D. Hertz

(57) ABSTRACT

A controller docking device comprising a controller casing having a mobile device receptacle extending inward from a casing front panel. Various user input devices are integrated into the front panel, preferably locating a directional controller on a left side and an action controller on a right side of the mobile device receptacle. Additional user input devices can also be integrated therein. The additional user input devices can include additional controller inputs located proximate one or both of the common game controller user input devices, along an intermediary circumferential panel of the casing, etc. Various mobile device controller communicative buttons can be integrated into the controller casing providing the user with an interface for operational capabilities of the mobile computing device. The docking device can provide inputs for an application used to control a remote controlled device, such as a vehicle, a toy, an entertainment component, etc.

20 Claims, 8 Drawing Sheets

(56) References Cited

U.S. PATENT DOCUMENTS

| | | | |
|---|---|---|---|
| D500,319 S | 12/2004 | Wada | |
| D527,005 S | 8/2006 | Navarrez | |
| 7,095,442 B2 | 8/2006 | Van Zee | |
| D528,106 S | 9/2006 | Lee et al. | |
| D529,493 S | 10/2006 | Ogasawara | |
| D532,829 S | 11/2006 | Kawanobe | |
| D543,528 S | 5/2007 | Kim | |
| D544,481 S | 6/2007 | Maddox et al. | |
| D548,235 S | 8/2007 | Krieger | |
| D552,688 S | 10/2007 | Hussaini | |
| D556,759 S | 12/2007 | Kawanobe | |
| D560,683 S | 1/2008 | Lee | |
| D568,884 S | 5/2008 | Kawanobe | |
| 7,400,917 B2 | 7/2008 | Wood et al. | |
| 7,580,728 B2 | 8/2009 | Vance et al. | |
| 7,733,637 B1 | 6/2010 | Lam | |
| D619,991 S | 7/2010 | Huang | |
| 7,755,905 B2 | 7/2010 | Kohnke | |
| D622,245 S | 8/2010 | Okada | |
| D624,129 S | 9/2010 | Lim | |
| 7,833,097 B1 | 11/2010 | Maddox et al. | |
| D632,341 S | 2/2011 | Lim | |
| D637,236 S | 5/2011 | Lum | |
| D639,260 S | 6/2011 | Carroll | |
| D641,022 S | 7/2011 | Dodo | |
| D641,049 S | 7/2011 | Ehara | |
| D643,476 S | 8/2011 | Ehara | |
| D645,521 S | 9/2011 | Ehara | |
| D650,447 S | 12/2011 | Ehara | |
| D664,601 S | 7/2012 | Sogabe | |
| D666,250 S | 8/2012 | Fulghum | |
| 8,330,305 B2 | 12/2012 | Hart et al. | |
| D681,127 S | 4/2013 | Ashida | |
| D682,947 S | 5/2013 | Akama | |
| D686,209 S | 7/2013 | Sun et al. | |
| D686,669 S | 7/2013 | Ashida | |
| 8,480,493 B2 | 7/2013 | Liotta et al. | |
| D689,138 S | 9/2013 | Ashida | |
| D689,496 S | 9/2013 | Park | |
| 8,529,357 B2 | 9/2013 | Joynes et al. | |
| 8,547,340 B2 | 10/2013 | Sizelove et al. | |
| 8,560,752 B2 | 10/2013 | Liberty | |
| 8,565,843 B1 | 10/2013 | Lugo | |
| D692,882 S | 11/2013 | Lakraa | |
| D694,829 S | 12/2013 | Ashida | |
| D697,141 S | 1/2014 | Sugino | |
| D699,791 S | 2/2014 | Sugino | |
| D710,945 S | 8/2014 | Biheller | |
| D711,312 S | 8/2014 | Tien | |
| D711,860 S | 8/2014 | Daniel | |
| D712,484 S | 9/2014 | Sumii | |
| D712,970 S | 9/2014 | Biheller | |
| D713,467 S | 9/2014 | Sawhney | |
| D713,468 S | 9/2014 | Sawhney | |
| D716,302 S | 10/2014 | Delgado | |
| D720,342 S | 12/2014 | Starrett | |
| D721,034 S | 1/2015 | Sui | |
| D723,032 S | 2/2015 | Schoenith | |
| D723,530 S | 3/2015 | Namminga | |
| D730,359 S | 5/2015 | Fustino | |
| 9,024,866 B2 * | 5/2015 | Feldstein | G06F 1/1656 345/156 |
| D735,718 S | 8/2015 | Pang | |
| D735,721 S | 8/2015 | Mar | |
| D736,859 S | 8/2015 | Joynes | |
| D737,273 S | 8/2015 | Schoenith | |
| 9,138,640 B2 | 9/2015 | Baum | |
| D740,797 S | 10/2015 | Daniel | |
| D740,885 S | 10/2015 | Nokuo | |
| D741,952 S | 10/2015 | Nokuo | |
| 9,281,859 B1 | 3/2016 | Lee | |
| D754,257 S | 4/2016 | Gallizzi | |
| D806,023 S | 12/2017 | Xu | |
| D808,947 S | 1/2018 | Taniho | |
| D813,234 S | 3/2018 | Nadler | |
| 9,914,060 B1 * | 3/2018 | Corigliano | A63F 13/98 |
| D815,211 S | 4/2018 | Buller | |
| D815,696 S | 4/2018 | Ehara | |
| D819,642 S | 4/2018 | Ehara | |
| D819,696 S | 6/2018 | Ehara | |
| 10,114,416 B1 | 10/2018 | D'penha | |
| D834,979 S | 12/2018 | Zhang | |
| D844,559 S | 4/2019 | Mercer | |
| 2002/0151282 A1 | 10/2002 | Wang | |
| 2002/0155890 A1 | 10/2002 | Ha et al. | |
| 2003/0184958 A1 | 10/2003 | Kao | |
| 2003/0186746 A1 | 10/2003 | Chuang | |
| 2004/0092318 A1 | 5/2004 | Chen | |
| 2005/0036293 A1 | 2/2005 | Kohnke | |
| 2005/0078086 A1 * | 4/2005 | Grams | A63F 13/06 345/158 |
| 2005/0181745 A1 | 8/2005 | Wood et al. | |
| 2006/0202865 A1 | 9/2006 | Nguyen | |
| 2006/0252537 A1 | 11/2006 | Wu | |
| 2008/0132289 A1 | 6/2008 | Wood et al. | |
| 2008/0266783 A1 | 10/2008 | Mills | |
| 2009/0034210 A1 | 2/2009 | Kohnke | |
| 2009/0291760 A1 | 11/2009 | Hepburn et al. | |
| 2010/0078343 A1 | 4/2010 | Hoellwarth | |
| 2010/0081505 A1 | 4/2010 | Alten et al. | |
| 2010/0195279 A1 | 8/2010 | Michael | |
| 2010/0200456 A1 | 8/2010 | Parkinson | |
| 2010/0328203 A1 | 12/2010 | Hsu | |
| 2011/0159324 A1 | 6/2011 | Huang | |
| 2011/0260830 A1 | 10/2011 | Weising | |
| 2012/0088558 A1 | 4/2012 | Song | |
| 2012/0318121 A1 | 12/2012 | Mittelstadt et al. | |
| 2012/0320503 A1 | 12/2012 | Yturralde | |
| 2013/0058022 A1 | 3/2013 | Knutson | |
| 2013/0065690 A1 | 3/2013 | Shim | |
| 2013/0077213 A1 | 3/2013 | Kao | |
| 2013/0080670 A1 | 3/2013 | Medica | |
| 2013/0094134 A1 | 4/2013 | Ashcraft | |
| 2013/0113698 A1 | 5/2013 | Kuroume | |
| 2013/0157764 A1 | 6/2013 | Joynes | |
| 2013/0184077 A1 | 7/2013 | Galpern | |
| 2014/0179437 A1 | 6/2014 | King | |
| 2015/0174482 A1 | 6/2015 | Hirshberg | |
| 2015/0273325 A1 | 10/2015 | Raic | |
| 2016/0072327 A1 | 3/2016 | Knutson | |
| 2016/0345472 A1 | 11/2016 | Park | |
| 2016/0361627 A1 | 12/2016 | Fujita | |
| 2018/0074550 A1 | 3/2018 | Sorias | |
| 2018/0314295 A1 | 11/2018 | D'penha | |

OTHER PUBLICATIONS

"Incorporating Controllers into Your Game"; Apple Inc.; accessed on the Internet <URL https://developer.apple.com/library/archive/documentation/ServicesDiscovery/Conceptual/GameControllerPG/IncorporatingControllersintoYourDesign/IncorporatingControllersintoYourDesign.html> dated Sep. 13, 2016.*

Rougeau, Michael; "Logitech PowerShell iPhone Controller review"; TechRadar; accessed on the Internet on Dec. 3, 2018 <URL https://www.techradar.com/reviews/gaming/logitech-powershell-iphone-controller-review-1200945/review>; Feb. 7, 2014 (Year: 2014).*

Feist, Jonathan; "9 fun drones you can control with your smartphone"; Android AUthority website accessed on Dec. 3, 2018; <URL https://www.androidauthority.com/best-smartphone-controlled-drones-744632/>; dated Jan. 28, 2018 (Year: 2018).*

Logitech PowerShell Controller + Battery Setup Guide; Logitech (Year: 2013).*

Mavic Pro User Manual V1.0; DJI; Oct. 2016 (Year: 2016).*

Logitech Powershell_Unboxing and Demo. youtube.com (Online Video) posted Dec. 9, 2013. [Retrieved on Apr. 10, 2019] https://www.youtube.comlwatch?v=1UXGhKoqACE.

About Game Controllers. developer.apple.com. (Online) last updated Sep. 13, 2016. [Retrieved on Apr. 11, 2019] https://developer.apple.comllibrary/archive/documentation/ServicesDiscovery/Conceptu.

* cited by examiner

CONTROLLER DOCKING DEVICE FOR PORTABLE ELECTRONICS AND METHOD OF USE

CROSS-REFERENCE TO RELATED APPLICATION

This Non-Provisional Utility Application is:
A) a Continuation-In-Part claiming the benefit of co-pending United States Non-Provisional Utility Patent application Ser. No. 14/540,008, filed on 12 Nov. 2014 (Scheduled to issue as U.S. Pat. No. 9,914,060 on Mar. 13, 2018);
B) wherein U.S. Non-Provisional patent application Ser. No. 14/540,008 is a Continuation-In-Part claiming the benefit of co-pending U.S. Non-Provisional patent application Ser. No. 13/546,769, filed on Monday, Jul. 16, 2012 (Now abandoned);
C) wherein U.S. Non-Provisional patent application Ser. No. 13/546,769 claims the benefit of U.S. Provisional Patent Application Ser. No. 61/508,291, filed on Jul. 15, 2011,
D) each of which is incorporated herein in its entirety.

FIELD OF THE INVENTION

The present disclosure generally relates to a docking device for a mobile computing device. More particularly, the present disclosure relates to a mobile computing device docking station provided in a form factor as a casing, wherein the docking station further comprises additional user interface controllers.

BACKGROUND OF THE INVENTION

Mobile computing devices continue to become commonplace in society. Portability has many positive aspects, but also has many negative aspects. Portable devices are preferably smaller in size, which limits the real estate for user interface features. Recent advances in portable computing devices utilize touch screen display panels in conjunction with graphical user interface (GUI) styled guides. The advantage of the GUI provides the designers the ability to design and utilize a variety of different styled layouts for control or entry of information into the mobile computing device. A drawback of the touch screen interface is the limited visible real estate. The display viewing area is of a fixed dimension and a portion of the viewing area must be dedicated for user interface. This can become a significant issue under certain conditions, such as when the user is playing a game and it would be advantageous to utilize the entire display area for viewing the game.

Protective cases are well known for use in conjunction with mobile computing devices. Protective cases are provided in a multitude of form factors and fabricated of a variety of materials. These can include plastic cases, metal cases, rubber cases, nylon cases, silicone cases, leather cases, faux leather cases, and the like. The designs can include cases having a unitary construction, a plurality of mechanically coupled components, fabricated of a single material, fabricated of multiple materials, and the like.

Generally, cases are limited to simply providing protection for the device. Some cases are enhanced with the inclusion of a portable power supply, such as an extra battery. Other cases, more specifically for tablet styled portable computing devices, include a standard keyboard. The keyboard is commonly battery powered and includes a Bluetooth wireless interface system, which provides wireless signal communication between the keyboard and the mobile computing device. The drawback is that the keyboards are generally large and moreso, fail to provide the desired controller arrangements for gaming.

What is desired is a device to provide additional user interface controllers to a mobile computing device.

SUMMARY OF THE INVENTION

The basic inventive concept provides a controller docking station for receiving, protecting, and providing a user interface with a mobile computing device, wherein the controller docking station further comprises at least one gaming controller user interface component.

A first aspect of the present invention provides a controller docking station comprising:
  a controller casing comprising a front panel, a rear panel, and an intermediary circumferential panel extending between a peripheral edge of the front panel and a peripheral edge of the rear panel, providing a spatial arrangement between the front panel and the rear panel;
  a mobile device receptacle formed extending inward from an exterior surface of the front panel for receiving and temporarily retaining a respective mobile computing device;
  a gaming controller interface integrated into the front panel of the controller casing; and
  an interface providing signal communication between the gaming controller interface and the mobile computing device.

A second aspect of the present invention incorporates an electro-mechanical connector interface for use as the interface providing signal communication between the gaming controller interface and the mobile computing device.

In another aspect, a Bluetooth wireless interface is integrated into the controller docking station for use as the interface providing signal communication between the gaming controller interface and the mobile computing device.

In yet another aspect, the gaming controller interface further comprises a two (2) direction rocker switch.

In yet another aspect, the gaming controller interface further comprises a four (4) direction rocker switch.

In yet another aspect, the gaming controller interface further comprises a pair of gaming controller interfaces.

In yet another aspect, the gaming controller interface further comprises a pair of gaming controller interfaces, wherein a first gaming controller interface is located adjacent to a first edge of the mobile device receptacle and the second gaming controller interface is located adjacent to a second, and opposite edge of the mobile device receptacle.

In yet another aspect, the gaming controller interface further comprises a plurality of user interface buttons arranged in a common game controller format.

In yet another aspect, at least one gaming controller interface further comprises two (2) user interface buttons arranged in a common game controller format.

In yet another aspect, at least one gaming controller interface further comprises four (4) user interface buttons arranged in a common game controller format.

In yet another aspect, the controller docking station further comprises at least one button interface extension member used to operate a respective user interface button provided on the mobile computing device.

In yet another aspect, the controller docking station casing further comprises a gripping feature on each side thereof.

In yet another aspect, the mobile device receptacle is formed to receive and retain the mobile computing device. The mobile device receptacle can be designed where the mobile computing device is inserted through the casing front panel in a direction generally perpendicular to a plane created by the casing front panel. Alternatively, the mobile computing device can be inserted at an angle to engage with a signal interface connector, and then rotated into the mobile device receptacle.

In yet another aspect, the mobile device receptacle is formed having a peripheral wall extending inward from an exterior surface of the casing front panel. The mobile device receptacle terminates at a mobile device receptacle backing panel.

In yet another aspect, the mobile device receptacle backing panel can additionally include a camera viewing port located in registration with a mobile device standard camera and/or a mobile device logo aperture in registration with a logo provided upon the mobile computing device.

In yet another aspect, the docking station can be configured for use as a controller for remote applications.

In yet another aspect, the docking station can be configured for use as a controller providing data entry into an application, the data entry being instructions to operate a portable computing device. Smartphones employ touch screens, which lack entry capabilities provided by devices such as a mouse, a trackball, a joystick, a rocker entry component, buttons, tactile buttons, and the like. The inclusion of one or more of these entry devices on the mobile computing device 200 introduces an enhanced data entry tool for the user.

In yet another aspect, the docking station can be configured for use as a controller providing data entry for instructions to operate a remote controlled device using an application operating on the portable computing device, wherein the application operates a remotely operated electronically controlled device, wherein the remotely operated electronically controlled device is one of a remote controlled car, a remote controlled truck, a remote controlled aeronautic vehicle, a remote controlled plane, a remote controlled helicopter, a remote controlled drone, a remote controlled water vessel, a remote controlled sailing vessel, a remote controlled motor-powered vessel, a remote controlled toy, a remote controlled wheel, a remote controlled ball, a remote controlled robot, a remote controlled droid, a remotely controlled television, a remotely controlled set top box, a remotely controlled stereo component, and the like.

In yet another aspect, the docking station can be configured for use as a controller providing data entry for guidance of motion association with an application operating on the portable computing device, wherein the application operates a remote controlled vehicle.

In yet another aspect, the docking station can be configured for use as a controller providing data entry for guidance of motion association with applications operating on the portable computing device, wherein the application operates a remote controlled vehicle, wherein the remote controlled vehicle is one of a remote controlled car, a remote controlled truck, a remote controlled aeronautic vehicle, a remote controlled plane, a remote controlled helicopter, a remote controlled drone, a remote controlled water vessel, a remote controlled sailing vessel, a remote controlled motor-powered vessel, a remote controlled wheel, and the like. The remote controlled vehicle can be of any size.

In yet another aspect, the docking station can be configured for use as a controller providing data entry for use with an application operating on the portable computing device, wherein the application operates a remote controlled toy, wherein the remote controlled toy is one of a remote controlled wheel, a remote controlled ball, a remote controlled robot, a remote controlled droid, and the like. The data entry can be one or more movement instructions, ASCII characters, use for repositioning a cursor, or any other suitable entry format or function.

In yet another aspect, the docking station can be configured for use as a controller providing data entry for use with an application with applications operating on the portable computing device, wherein the application operates a remote controlled entertainment component, wherein the remote controlled entertainment component is one of a remotely controlled television, a remotely controlled set top box, a remotely controlled stereo component, and the like. Examples of controls include incrementing a channel selection, adjusting a volume, requesting to record a program, change an input selection, change an output selection, operate a digital recorder function (i.e. pause, fast forward, rewind, etc.), operate a menu, and the like.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
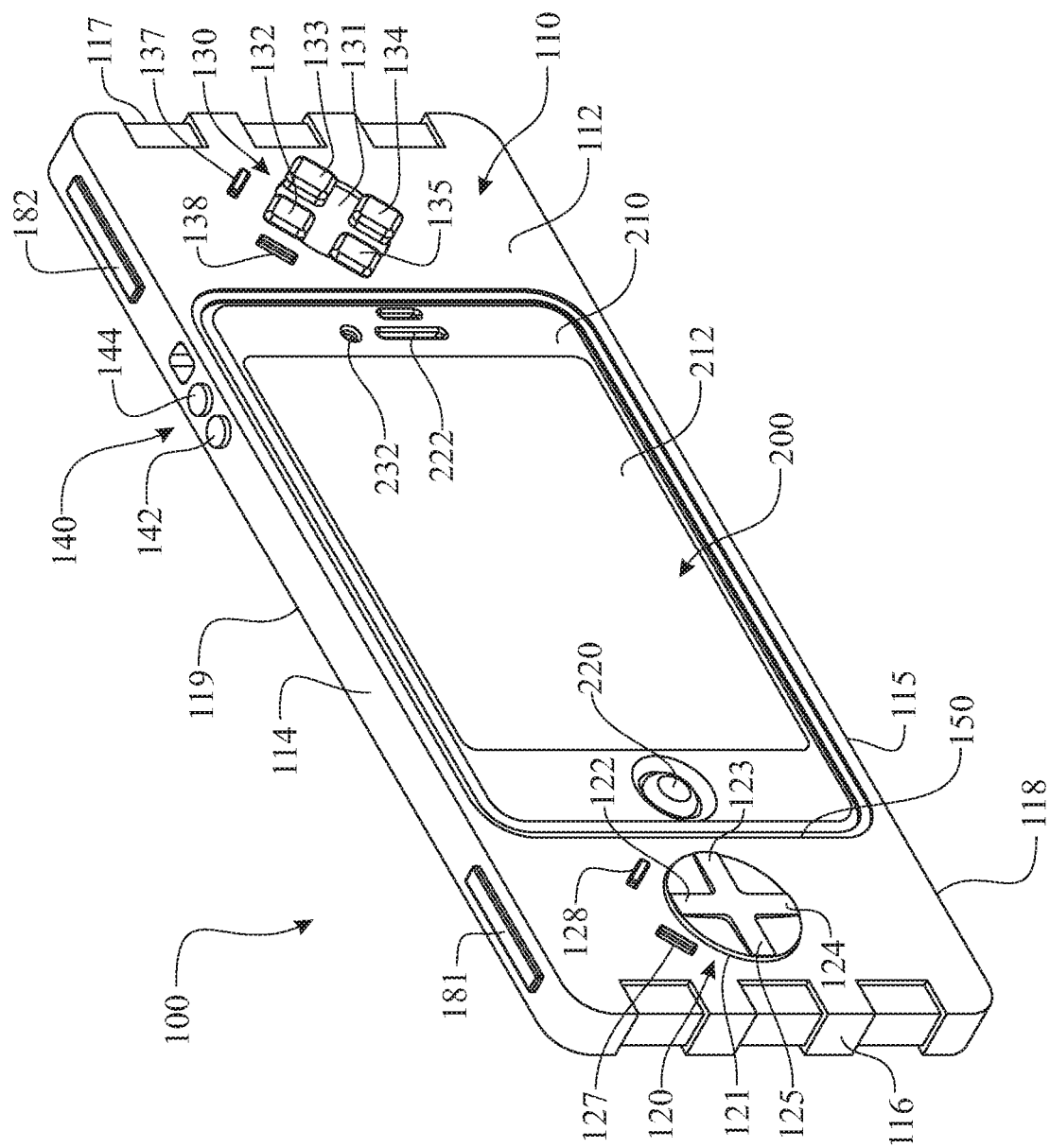
FIG. 1 presents a front isometric view of a controller docking station in accordance with an exemplary embodiment of the present invention.
Figure 2:
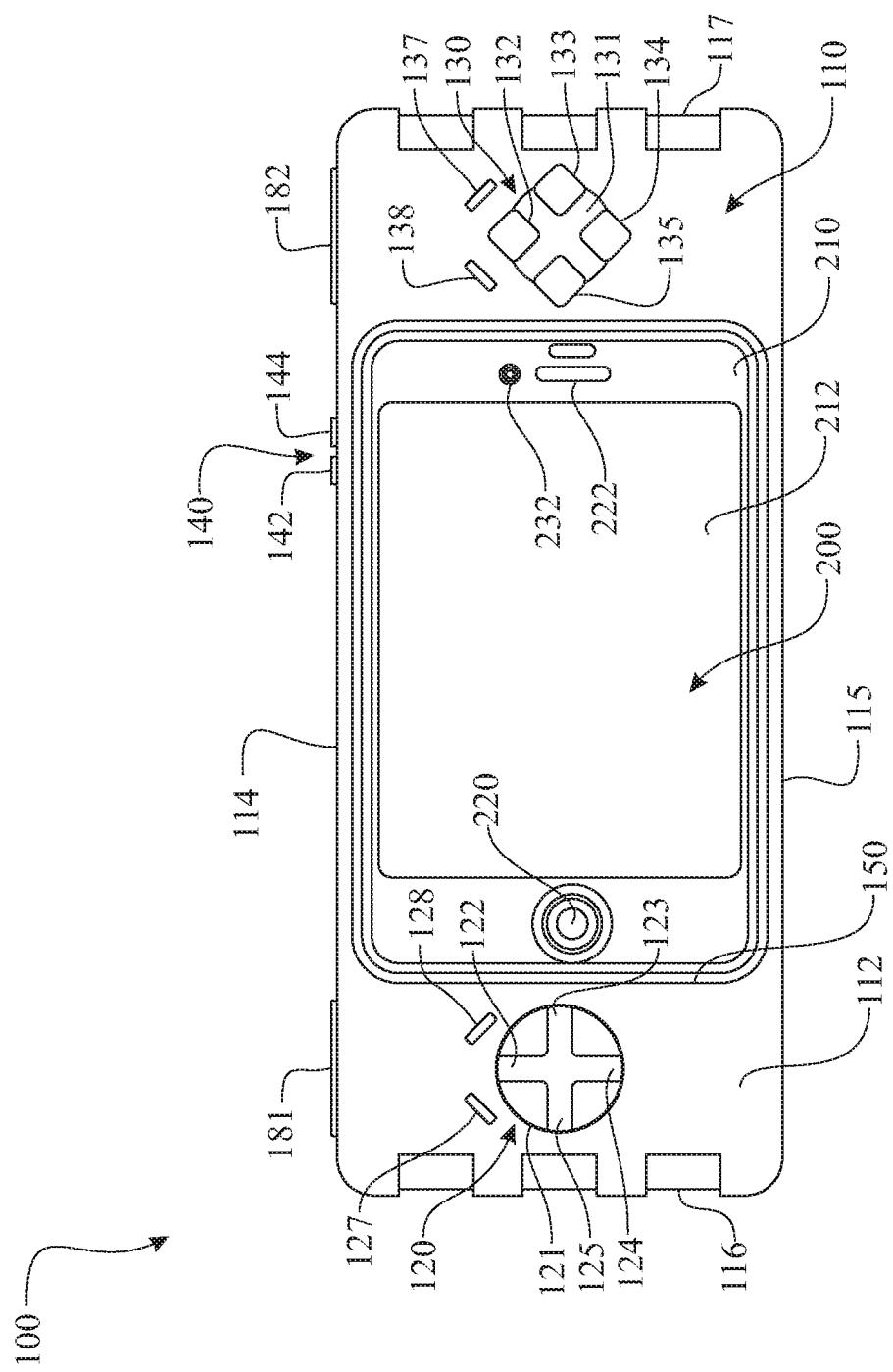
FIG. 2 presents a front view of the controller docking station, originally introduced in FIG. 1, wherein the illustration includes an exemplary mobile computing device assembled into the controller docking station.
Figure 3:
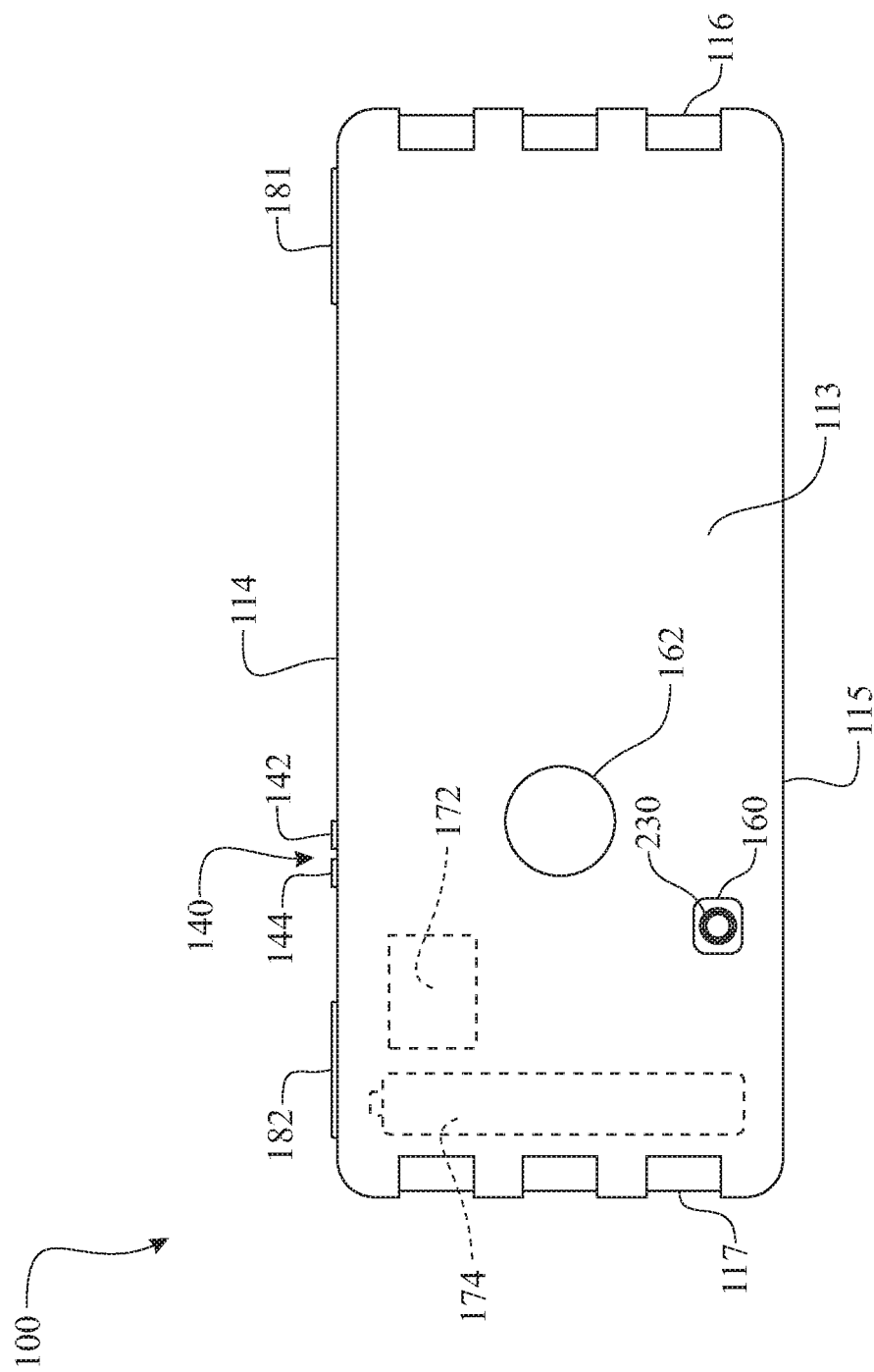
FIG. 3 presents a rear view of the controller docking station, originally introduced in FIG. 1.
Figure 4:
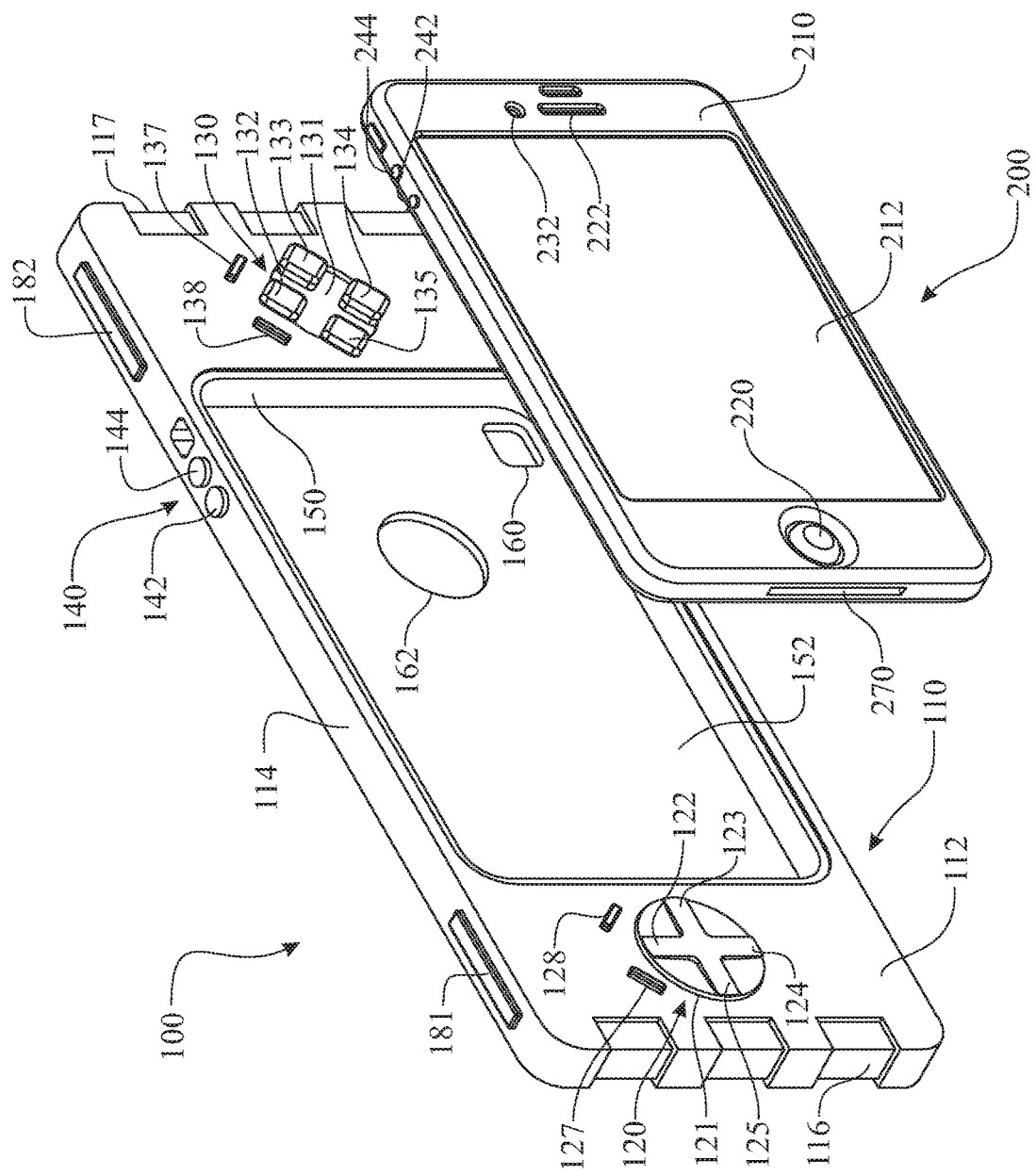
FIG. 4 presents a front isometric view of the controller docking station, originally introduced in FIG. 1, wherein the mobile computing device is shown separated from a mobile device receptacle.
Figure 5:
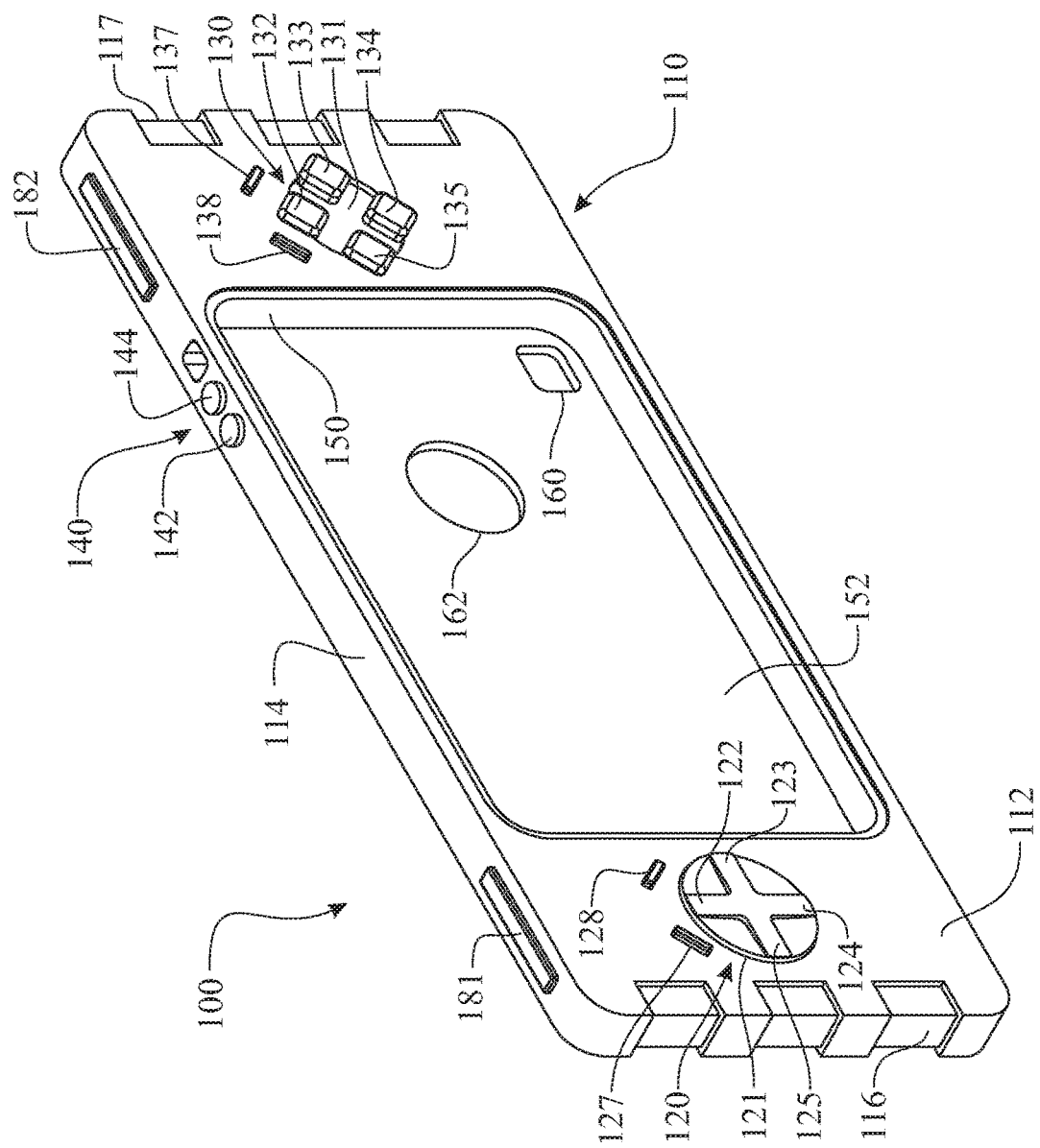
FIG. 5 presents a front isometric view of the controller docking station, originally introduced in FIG. 1, the controller docking station is shown being exclusive of the mobile computing device.
Figure 6:
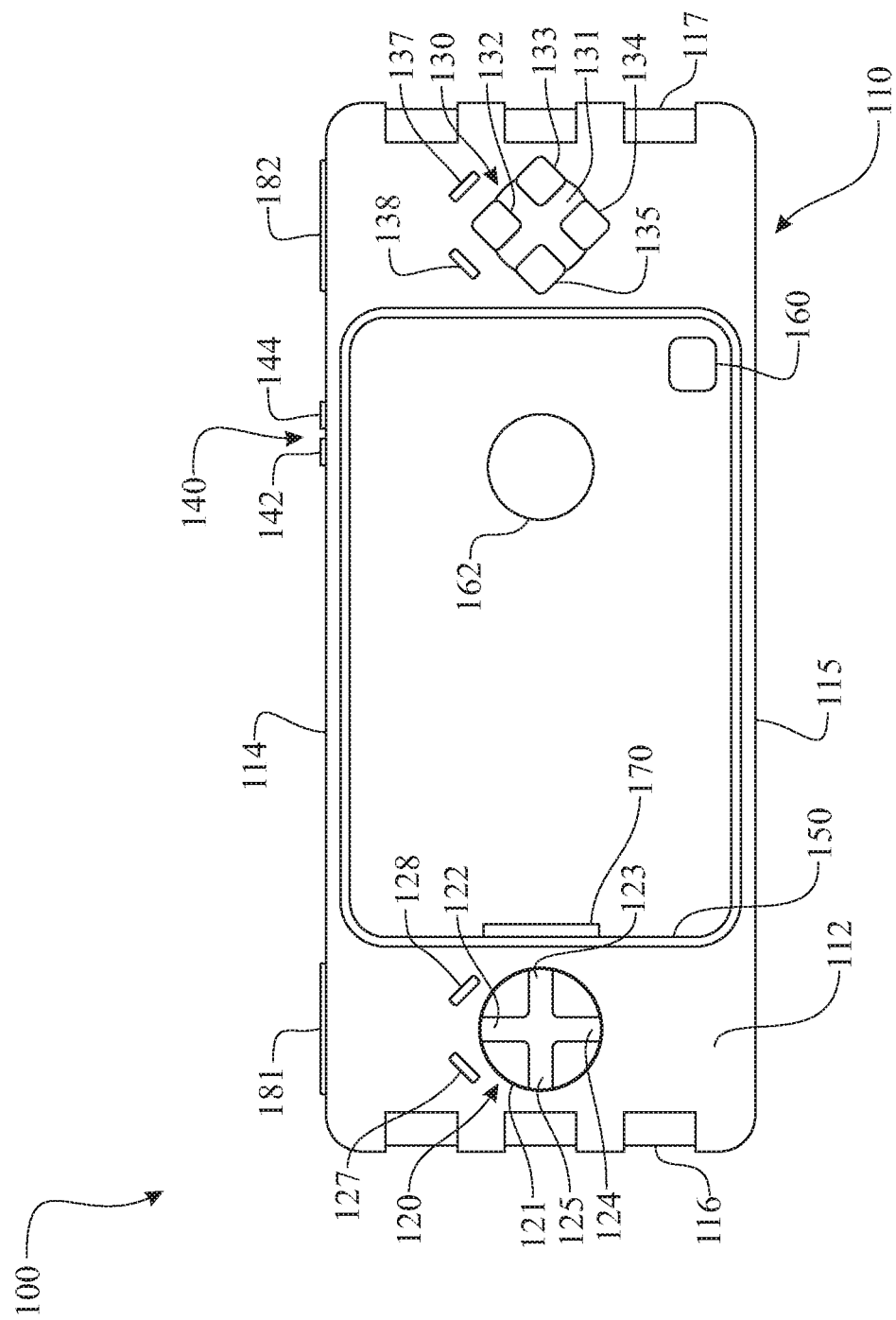
FIG. 6 presents a front view of the controller docking station, originally introduced in FIG. 1, the controller docking station is shown being exclusive of the mobile computing device.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary embodiment of a controller docking device 100 is illustrated and detailed in FIGS. 1 through 6. The controller docking device 100 is preferably fabricated comprising a controller casing 110 having a unitary construction. The controller casing 110 is formed having a casing front panel 112 and a casing rear panel 113 and an intermediary circumferential panel comprising a casing top panel 114, a casing bottom panel 115, a casing first side panel 116, and a casing second side panel 117; the intermediary circumferential panel extending between a peripheral edge 118 of the casing front panel 112 and a peripheral edge 119 of the casing rear panel 113, providing a spatial arrangement between the casing front panel 112 and the casing rear panel 113. A mobile device receptacle 150 is formed within the controller casing 110, wherein the mobile device receptacle 150 extends inward from an exterior surface (identified by description) of the casing front panel 112, terminating at a mobile device receptacle backing panel 152, wherein the mobile device receptacle 150 is provided for receiving and temporarily retaining a respective mobile computing device 200.

The mobile computing device 200 can include any portable computing device, including a smartphone, a tablet, a personal data assistant, and the like. The mobile computing device 200 includes a mobile device display 212 carried by a mobile device housing 210. The mobile device display 212 is preferably a touch screen display with a viewing area that spans across a large percentage of a front surface of the mobile device housing 210. The mobile computing device 200 includes a variety of user interfaces, including a mobile device controller 220 used for operational control of the mobile computing device 200, a mobile device audio output 222 enabling the user to listen to voice communications, a mobile device standard camera 230 enabling the user to capture digital still or video images visible from a rear side of the mobile computing device 200, a mobile device reverse viewing camera 232 enabling the user to capture digital still or video images visible from a front side of the mobile computing device 200, and other functional user controls including a volume reduction controller 242 and a volume increasing controller 244.

The mobile device receptacle 150 is sized and shaped to receive and temporarily retain the mobile computing device 200 therein. More specifically, the mobile device receptacle 150 is sized and shaped to receive and retain the mobile device housing 210 of the mobile computing device 200 therein. The design of the mobile device receptacle 150 takes the size and shape of the mobile device display 212 into consideration to ensure the entire mobile device display 212 remains visible. It is understood that additional features such as buttons, snaps, and the like can be integrated into the controller casing 110 or mobile device receptacle 150 to aid in retaining the mobile computing device 200 within the mobile device receptacle 150.

The controller casing 110 can additionally include features to retain full functionality of the mobile computing device 200, such as one or more mobile device controller buttons 140 and various apertures, such as a camera viewing port 160 and a mobile device logo aperture 162. The exemplary mobile device controller buttons 140 include a volume reduction controller 142 and a volume increasing controller 144. The volume reduction controller 142 would engage with the volume reduction controller 242. Similarly, the volume increasing controller 144 would engage with the volume increasing controller 244. It is understood that any mobile device controller communicative button 140 can be integrated into the controller casing 110 to support any respective user interface controls of the mobile computing device 200. The mobile device controller communicative button 140 can directly engage with the user interface control of the mobile computing device 200 or engage through a motion redirecting arrangement, such as a cantilevered arm, a pivotal arm, and the like. The camera viewing port 160 would be located in registration with a mobile device standard camera 230 of the mobile computing device 200 when the mobile computing device 200 is inserted into the mobile device receptacle 150. Similarly, the mobile device logo aperture 162 would be located in registration with a logo or other artwork feature applied to a rear surface of the mobile computing device 200 when the mobile computing device 200 is inserted into the mobile device receptacle 150. The mobile device logo aperture 162 (or any suitable aperture) can be used to aid in removal of the mobile computing device 200 from the mobile device receptacle 150. The mobile device logo aperture 162 (or any suitable aperture) would preferably be sized to accept a finger. The user would insert an object, such as their finger through the mobile device logo aperture 162 (or any suitable aperture) and apply a force to a rear surface of the mobile computing device 200 to initially rotate the mobile computing device 200 out of the mobile device receptacle 150.

The controller docking device 100 can interface with the mobile computing device 200 by any reasonable signal interface known by those skilled in the art. The illustrated embodiment includes two exemplary signal interfaces, a controller integrated electro-mechanical interface 170 and a Bluetooth wireless interface 172. The controller integrated electro-mechanical interface 170 detachable mates with a mobile device integrated electro-mechanical interface 270 integrated into the mobile computing device 200, providing an electromechanical connection. Mechanically, the joint formed between the controller integrated electro-mechanical interface 170 and the mobile device integrated electro-mechanical interface 270 aids in retaining the mobile computing device 200 within the mobile device receptacle 150. The electrical component of the joined interface formed between the controller integrated electro-mechanical interface 170 and the mobile device integrated electro-mechanical interface 270 provides power and signal communication between the controller docking device 100 and the mobile computing device 200.

The controller integrated electro-mechanical interface 170 can include a power transfer interface, wherein the controller docking device 100 would include a portable power source 174, which is in electrical communication with the controller integrated electro-mechanical interface 170. The controller integrated electro-mechanical interface 170, in turn, transfers electrical energy from the portable power source 174 to the mobile computing device 200. It is understood that a power regulating circuit can be integrated between the portable power source 174 and the controller integrated electro-mechanical interface 170 to regulate the voltage, current, or both. The portable power source 174 can be any portable power source, including a battery, a capacitor, a solar power converter, a kinetic electrical generator, a chemical electrical generator, and the like.

The controller docking device 100 includes features commonly associated with a gamepad. The exemplary controller docking device 100 includes a first controller 120, which can also be referred to as a directional input button, and a second controller 130, which can also be referred to as an action button. The first controller 120 is generally provided as a user interface to enter directional controls into the mobile computing device 200. The second controller 130 is generally provided as a user interface to enter action controls into the mobile computing device 200. The exemplary layout and functionality of the controller docking device 100 would be consistent with most modern game controllers, which are close variations originating from the standard gamepad.

The controller docking device 100 can include at least one first controller 120. The preferred embodiment includes a first controller 120 and a second controller 130. The first controller 120 is located adjacent to a first side edge of the mobile device receptacle 150 and the second controller 130 is located adjacent to a second, opposite side edge of the mobile device receptacle 150. The preferred arrangement locates the first controller 120 on the left side of the mobile device receptacle 150 and the second controller 130 on the right side of the mobile device receptacle 150. This arrangement would be consistent with the currently available gaming controllers.

The exemplary first controller 120 is preferably provided in a form of a rocker switch. The first controller 120 is commonly referred to as a directional pad (or D-Pad). The first controller 120 can be segmented into four quadrants, which function as a first controller first quadrant 122, a first controller second quadrant 123, a first controller third quadrant 124, and a first controller fourth quadrant 125. Each of the quadrants 122, 123, 124, 125 can be integrated into a first controller button unitary member 121 as s unitary controller, wherein each quadrant 122, 123, 124, 125 would be represented by shape and location upon the first controller button unitary member 121. The preferred first controller 120 is provided as a digital input device. The generally available first controller 120 enters only the directions provided on the D-pad buttons, without any intermediate values. However, it is understood that combinations of two directions (up and left, for example) can provide entry of a diagonal movement request, wherein an exemplary D-pad can be integrated therein to provide eight-directional input. It is understood that the first controller 120 can be provided as an analog input device. The analog entry devices are not as accurate as comparable digital devices, they require a significant amount of maintenance by comparison, and protrude further from the controller surface.

The exemplary second controller 130 is preferably provided in a form of a series of independent buttons. The second controller 130 is commonly referred to as action buttons. The second controller 130 commonly includes a series of four entry buttons, including a second controller first button 132, a second controller second button 133, a second controller third button 134, and a second controller fourth button 135, wherein the buttons are arranged in a general diamond shaped layout. Each of the four buttons 132, 133, 134, 135 can be integrated into a button subassembly 131 comprising four independently operating buttons 132, 133, 134, 135 and a signal interface to a mating circuit.

Additional user input buttons 127, 128, 137, 138 can be located proximate each of the first controller 120 and second controller 130. The additional user input buttons 127, 128, 137, 138 provide the user with additional functionality for controlling the mobile computing device 200. The first controller top left user input 127 and first controller top right user input 128 are associated with the first controller 120. Similarly, the second controller top right user input 137 and second controller top left user input 138 are associated with the second controller 130.

The controller docking device 100 can include a top left edge control button 181 and a top right edge control button 182 are preferably integrated into the casing top panel 114 of the controller casing 110. The top left edge control button 181 and top right edge control button 182 can be designated to provide entry of any variety of controller information.

It is understood that the user entry controller buttons 120, 130, 181, 182 can have preset controls or related functions for the respective software (such as a game), user programmable controls, and the like, or any combination thereof.

Features of the controller casing 110, such as the casing first side panel 116 and casing second side panel 117, can be formed to aid the user in gripping the controller docking device 100. The exemplary embodiment includes spatially arranged notches along each of the side edges 116, 117.

Figure 7:
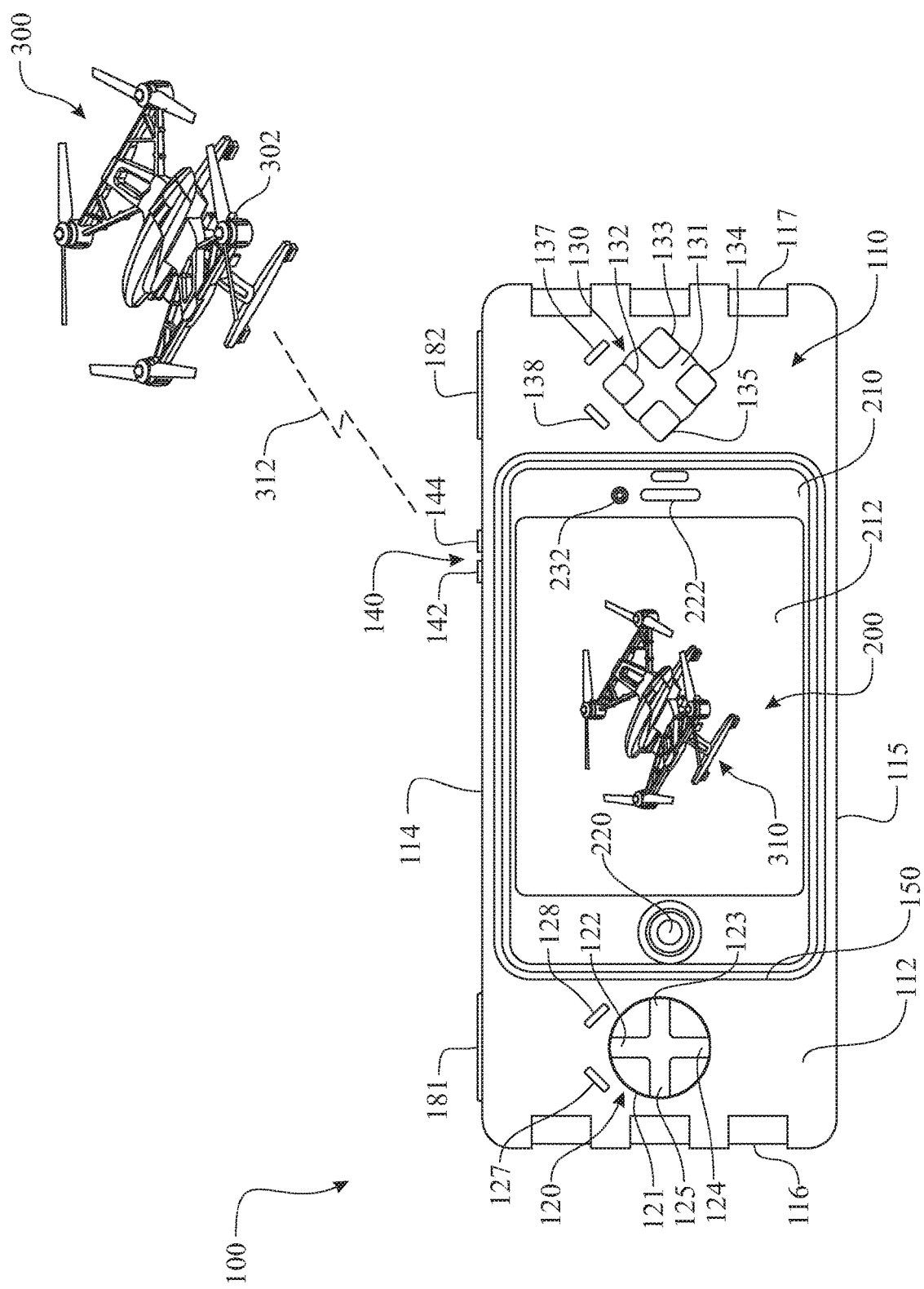
FIG. 7 presents a schematic diagram illustrating an exemplary application of the controller docking station as a controller for a remote controlled vehicle.
Figure 8:
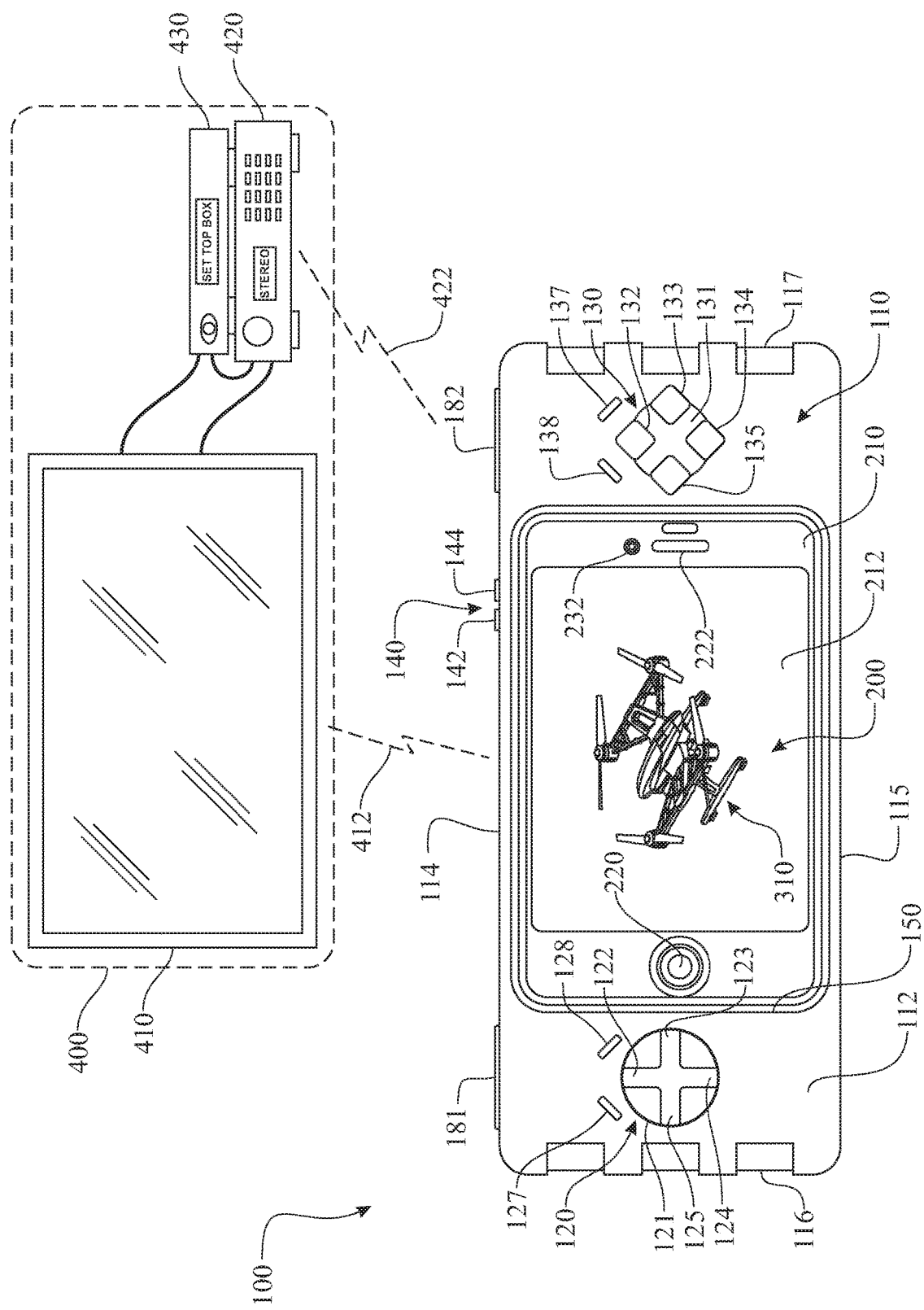
FIG. 8 presents a schematic diagram illustrating an exemplary application of the controller docking station as a controller for at least one remote controlled entertainment component.

The controller docking device 100 can be utilized to provide a data entry method for operating an application running on the mobile computing device 200, wherein the application provides operational signals and a wireless signal from the mobile computing device 200 to convey operating instructions to a remote controlled device, as illustrated in FIGS. 7 and 8. The controller docking device 100 can be configured for use as a controller providing data entry for instructions to operate a remote controlled device using a application operating on the mobile computing device 200, wherein the application operates a remotely operated electronically controlled device, the remotely operated electronically controlled device being one of: a remote controlled vehicle 300 (FIG. 7), a remote controlled car, a remote controlled truck, a remote controlled aeronautic vehicle, a remote controlled plane, a remote controlled helicopter, a remote controlled drone, a remote controlled water vessel, a remote controlled sailing vessel, a remote controlled motor-powered vessel, a remote controlled toy, a remote controlled wheel, a remote controlled ball, a remote controlled robot, a remote controlled droid, a component of a remote controlled entertainment system 400 (FIG. 8), a remotely controlled television, a remotely controlled set top box, a remotely controlled stereo component, and the like.

The controller docking device 100 can be configured for use as a controller providing data entry for guidance of motion association with an application operating on the mobile computing device 200, wherein the application operates a remote controlled vehicle.

In yet another aspect, the controller docking device 100 can be configured for use as a controller providing data entry for guidance of motion association with applications operating on the mobile computing device 200, wherein the application operates a remote controlled vehicle, as shown in the exemplary illustration of FIG. 7. The exemplary remote controlled vehicle 300 is a drone. It is understood the remote controlled vehicle 300 can be any of: a remote controlled car, a remote controlled truck, a remote controlled motorcycle, a remote controlled aeronautic vehicle, a remote controlled plane, a remote controlled helicopter, a remote controlled drone, a remote controlled water vessel, a remote controlled sailing vessel, a remote controlled motor-powered vessel, a remote controlled wheel, and the like. The remote controlled vehicle can be of any size, from a small toy to a tactical vehicle. The remote controlled vehicle 300 can be equipped with data collection equipment, such as a remote controlled vehicle camera 302, an infra-red camera, a Global Positioning System (GPS), lights, a sound emitting device (such as a speaker), and the like. The user can monitor the operation of the remote controlled vehicle 300 on the mobile device display 212 of the mobile computing device 200. A remote controlled vehicle image 310 can be displayed on the mobile device display 212 to aid the user in understanding the status of the remote controlled vehicle 300. The mobile device display 212 can display operating information, such as location of the remote controlled vehicle 300, a travel path of the remote controlled vehicle 300, a current speed of the remote controlled vehicle 300, a current direction of the remote controlled vehicle 300, an altitude of the remote controlled vehicle 300, an angle of incidence of the remote controlled vehicle 300, any video acquired by the remote controlled vehicle camera 302 (sound can be emitted by the mobile device audio output 222 of the mobile computing device 200), and the like. The mobile computing device 200 can communicate with the remote controlled vehicle 300 using any suitable wired or preferably wireless communication signal, exemplified by a remote control signal 312. The remote control signal 312 can utilize any suitable wireless communication protocol, including Bluetooth (commonly integrated into the mobile computing device 200), Wi-Fi (commonly integrated into the mobile computing device 200), or using an externally provided transceiver, such as any other Radio Frequency (RF technology).

The first controller 120 and/or the second controller 130 can be configured as a trackball, a joystick, a steering wheel, or any other suitable entry component form factor on the controller docking device 100 to aid the user in providing guidance data to the application running on the mobile computing device 200.

In an adapted application, the controller docking device 100 can be configured for use as a controller providing data entry for use with an application operating on the mobile computing device 200, wherein the application operates a remote controlled toy (understood by similarity with the remote controlled vehicle 300 illustrated in FIG. 7. The remote controlled toy can be any one of: a remote controlled wheel, a remote controlled ball, a remote controlled robot, a remote controlled droid, and the like. The data entry can be one or more movement instructions, ASCII characters, use for repositioning a cursor, or any other suitable entry format or function. It is understood that the controller docking device 100 can include a keyboard. The size of the controller casing 110 can be such to accommodate a reasonably sized keyboard.

In another adapted application, the controller docking device 100 can be configured for use as a controller providing data entry for use with an application with applications operating on the mobile computing device 200, wherein the application operates a remote controlled entertainment component of a remote controlled entertainment system 400, as illustrated in FIG. 8. The remote controlled entertainment component can be any one or more of: a remote controlled television 410, a remote controlled audio component 420, a remote controlled set top box 430, and the like. Examples of control features include incrementing a channel selection, adjusting a volume, requesting to record a program, change an input selection, change an output selection, operate a digital recorder function (i.e. pause, fast forward, rewind, etc.), operate a menu, and the like. Other control features commonly available on an original equipment manufacturer remote control can be integrated into an application utilizing the controller docking device 100 and mobile computing device 200 combination.

The mobile computing device 200 can communicate with the remote controlled entertainment system 400, the remote controlled television 410, the remote controlled audio component 420 and/or the remote controlled set top box 430 using any suitable wired or preferably wireless communication signal, exemplified by a remote controlled television signal 412 and a remote controlled audio component signal 422. The remote controlled television signal 412 and a remote controlled audio component signal 422 can utilize any suitable wireless communication protocol, including Bluetooth (commonly integrated into the mobile computing device 200), Wi-Fi (commonly integrated into the mobile computing device 200), or using an externally provided transceiver, such as an infra-red (IR) communication protocol, any other Radio Frequency (RF technology), and the like. Infra-red (IR) communication protocol and other wireless communication protocols can be integrated into the mobile computing device 200 and employed accordingly.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method of using a controller docking device for providing input to an instruction set operating on a portable computing device, the method comprising steps of:

obtaining a controller docking device comprising:
controller casing comprising a front panel, a rear panel, and an intermediary circumferential panel extending between a peripheral edge of the front panel and a peripheral edge of the rear panel, providing a spatial arrangement between the front panel and the rear panel;
a portable computing device receptacle comprising a portable computing device receptacle sidewall extending substantially perpendicularly inward from an exterior surface of the front panel and terminating at a portable computing device receptacle backing panel for receiving and temporarily retaining a respective portable computing device, wherein the portable computing device receptacle sidewall is fixed about all four sides, wherein the portable computing device receptacle sidewall is sized and shaped at least partially following a peripheral contour of a portable computing device, contacting each of four side surfaces of the portable computing device;
at least one user input interface integrated into the front panel of the controller casing; and
a controller integrated electro-mechanical interface rigidly and in a fixed position extending outward from the portable computing device receptacle sidewall inward towards a center of the portable computing device receptacle;

obtaining a portable computing device comprising:
a portable computing device housing,
a portable computing device display carried by the portable computing device housing, and
a portable computing device integrated electro-mechanical interface integrated into the portable computing device housing;

orienting the portable computing device at an acute angle respective to the controller docking device;

aligning the portable computing device integrated electro-mechanical interface and the controller integrated electro-mechanical interface with one another;

joining the portable computing device integrated electro-mechanical interface and the controller integrated electro-mechanical interface to one another;

rotating the portable computing device into the portable computing device receptacle;

activating the portable computing device;

initiating operation of the instruction set on the portable computing device; and utilizing the at least one user input interface to provide directives to the instruction set operating on the portable computing device.

2. A method of using a controller docking device as recited in claim 1, the at least one user input interface of the controller docking device further comprising a first user input interface located between a casing first side panel and a first side of the portable computing device receptacle and a second user input interface located between a casing second, opposite side panel and a second, opposite side of the portable computing device receptacle, the method further comprising at least one of:
a step of utilizing the first user input interface to provide input to the instruction set operating on the portable computing device, and
a step of utilizing the second user input interface to provide input to the instruction set operating on the portable computing device.

3. A method of using a controller docking device as recited in claim 2, said first controller is provided as a single button having at least four directional control signal inputs, the method further comprising a step of:
operating the single button in a manner to provide at least four directional control signal inputs to provide input to the instruction set operating on the portable computing device.

4. A method of using a controller docking device as recited in claim 2, said second controller is provided as a cluster of individual buttons, the method further comprising a step of:
operating the cluster of individual buttons in a manner to provide a series of control signal inputs, each control signal input of the series of control signal inputs provides a unique signal input to provide input to the instruction set operating on the portable computing device.

5. A method of using a controller docking device as recited in claim 2, the controller docking device further comprising at least one additional user input device located proximate said first controller, the method further comprising a step of:
operating the at least one additional user input device in a manner to provide an associated input signal to provide input to the instruction set operating on the portable computing device.

6. A method of using a controller docking device as recited in claim 2, the controller docking device further comprising a rear panel aperture formed through the rear panel of the controller casing, the method further comprising steps of:
inserting an object through the rear panel aperture; and
using the object to apply a force to a rear surface of the portable computing device to aid in removing the portable computing device from the portable computing device receptacle.

7. A method of using a controller docking device as recited in claim 1, the controller docking device further comprising at least one additional user input device located proximate said first controller, the method further comprising a step of:
operating the at least one additional user input device in a manner to provide an associated input signal to provide input to the instruction set operating on the portable computing device.

8. A method of using a controller docking device as recited in claim 1, the controller docking device further comprising at least one edge located controller button located on said intermediary circumferential panel, the method further comprising a step of:
operating the at least one edge located controller button in a manner to provide an associated input signal to provide input to the instruction set operating on the portable computing device.

9. A method of using a controller docking device as recited in claim 1, the controller docking device further comprising a rear panel aperture formed through the rear panel of the controller casing, the method further comprising steps of:
inserting an object through the rear panel aperture; and
using the object to apply a force to a rear surface of the portable computing device to aid in removing the portable computing device from the portable computing device receptacle.

10. A method of using a controller docking device for providing input to an instruction set operating on a portable computing device, the method comprising steps of:
obtaining a controller docking device comprising:
controller casing comprising a front panel, a rear panel, and an intermediary circumferential panel extending between a peripheral edge of the front panel and a peripheral edge of the rear panel, providing a spatial arrangement between the front panel and the rear panel;
a portable computing device receptacle comprising a portable computing device receptacle sidewall extending substantially perpendicularly inward from an exterior surface of the front panel and terminating at a portable computing device receptacle backing panel for receiving and temporarily retaining a respective portable computing device, wherein the portable computing device receptacle sidewall is fixed about all four sides, wherein the portable computing device receptacle sidewall is sized and shaped following a peripheral contour of a portable computing device, contacting all four side surfaces of the portable computing device;
a first user input interface integrated into the front panel of the controller casing located between a casing first side panel and a first side of the portable computing device receptacle;
a second user input interface integrated into the front panel of the controller casing located between a casing second, opposite side panel and a second, opposite side of the portable computing device receptacle; and a controller integrated electro-mechanical interface rigidly and in a fixed position extending outward from the portable computing device receptacle sidewall inward towards a center of the portable computing device receptacle;

obtaining a portable computing device comprising:

a portable computing device housing, a portable computing device display carried by the portable computing device housing, and a portable computing device integrated electro-mechanical interface integrated into the portable computing device housing;

orienting the portable computing device at an acute angle respective to the controller docking device;

aligning the portable computing device integrated electro-mechanical interface and the controller integrated electro-mechanical interface with one another;

joining the portable computing device integrated electro-mechanical interface and the controller integrated electro-mechanical interface to one another;

rotating the portable computing device into the portable computing device receptacle about an axis that is substantially parallel to an intersection between an elongated axis of the controller integrated electro-mechanical interface and the respective portable computing device receptacle sidewall;

activating the portable computing device;

initiating operation of the instruction set; and utilizing at least one of the first user input interface and the second user input interface to provide directions to the instruction set operating on the portable computing device.

11. A method of using a controller docking device as recited in claim 10, the method further comprising a step of:
utilizing the first user input interface to provide directions to the instruction set operating on the portable computing device, and
utilizing the second user input interface to provide directions to the instruction set operating on the portable computing device.

12. A method of using a controller docking device as recited in claim 10, said first controller is provided as a single button having at least four directional control signal inputs, the method further comprising a step of:
operating the single button in a manner to provide at least four directional control signal inputs to provide input to the instruction set operating on the portable computing device.

13. A method of using a controller docking device as recited in claim 10, said second controller is provided as a cluster of individual buttons, the method further comprising a step of:
operating the cluster of individual buttons in a manner to provide a series of control signal inputs, each control signal input of the series of control signal inputs provides a unique signal input to provide input to the instruction set operating on the portable computing device.

14. A method of using a controller docking device as recited in claim 10, said first controller is provided as a single disc shaped input device, wherein said disc tilts in at least four directions, providing at least four respective input signals, the method further comprising a step of:
operating the single disc shaped input device in a manner to provide a series of control signal inputs, each control signal input of the series of control signal inputs provides a unique signal input to provide input to the instruction set operating on the portable computing device.

15. A method of using a controller docking device as recited in claim 14, said second controller is provided as a cluster of individual buttons, the method further comprising a step of:
operating the cluster of individual buttons in a manner to provide a series of control signal inputs, each control signal input of the series of control signal inputs provides a unique signal input to provide input to the instruction set operating on the portable computing device.

16. A method of using a controller docking device as recited in claim 10, the controller docking device further comprising at least one additional user input device located proximate said first controller, the method further comprising a step of:
operating the at least one additional user input device in a manner to provide an associated input signal to provide input to the instruction set operating on the portable computing device.

17. A method of using a controller docking device as recited in claim 10, the controller docking device further comprising a rear panel aperture formed through the rear panel of the controller casing, the method further comprising steps of:
inserting an object through the rear panel aperture; and
using the object to apply a force to a rear surface of the portable computing device to aid in removing the portable computing device from the portable computing device receptacle.

18. A method of using a controller docking device for providing input to an instruction set operating on a portable computing device, the method comprising steps of:
obtaining a controller docking device comprising:
controller casing comprising a front panel, a rear panel, and an intermediary circumferential panel extending between a peripheral edge of the front panel and a peripheral edge of the rear panel, providing a spatial arrangement between the front panel and the rear panel;
a portable computing device receptacle comprising a portable computing device receptacle sidewall extending substantially perpendicularly inward from an exterior surface of the front panel and terminating at a portable computing device receptacle backing panel for receiving and temporarily retaining a respective portable computing device, wherein the portable computing device receptacle sidewall is fixed about each of four sides, wherein the portable computing device receptacle sidewall is sized and shaped following a peripheral contour of a portable computing device, contacting each of four side surfaces of the portable computing device;
a user input interface integrated into the front panel of the controller casing;
a controller integrated electro-mechanical interface rigidly and in a fixed position extending outward from the portable computing device receptacle sidewall inward towards a center of the portable computing device receptacle, and
a portable power supply in electrical communication with the controller integrated electro-mechanical interface;
obtaining a portable computing device comprising:
a portable computing device housing having a substantially planar front surface bound by a front surface peripheral edge, a substantially planar rear surface bound by a rear surface peripheral edge and a side surface extending between the front surface peripheral edge and the second surface peripheral edge, the front surface peripheral edge and the second surface peripheral edge having the same shape and size, a portable computing device display carried by the portable computing device housing, and a portable computing device integrated electro-mechanical interface integrated into the device housing;

orienting the portable computing device at an acute angle respective to the controller docking device;

aligning the portable computing device integrated electro-mechanical interface and the controller integrated electro-mechanical interface with one another;

joining the portable computing device integrated electro-mechanical interface and the controller integrated electro-mechanical interface to one another;

rotating the portable computing device into the portable computing device receptacle about an axis that is substantially parallel to an intersection between an elongated axis of the controller integrated electro-mechanical interface and the respective portable computing device receptacle sidewall;

providing power from the portable power supply to the portable computing device;

activating the portable computing device;

initiating operation of the instruction set;

utilizing the user input interface to provide directions to the instruction set operating on the portable computing device.

19. A method of using a controller docking device as recited in claim 18, the controller docking device further comprising a first user input interface located between a casing first side panel and a first side of the portable computing device receptacle and a second user input interface located between a casing second, opposite side panel and a second, opposite side of the portable computing device receptacle, the method further comprising a step of:

utilizing the first user input interface to provide directions to the instruction set operating on the portable computing device, and utilizing the second user input interface to provide directions to the instruction set operating on the portable computing device.

20. A method of using a controller docking device as recited in claim 18, the controller docking device further comprising a rear panel aperture formed through the rear panel of the controller casing, the method further comprising steps of:

inserting an object through the rear panel aperture; and using the object to apply a force to a rear surface of the portable computing device to aid in removing the portable computing device from the portable computing device receptacle.

* * * * *